US010162603B2

(12) United States Patent
Goergens et al.

(10) Patent No.: US 10,162,603 B2
(45) Date of Patent: Dec. 25, 2018

(54) LOADING DATA FOR ITERATIVE EVALUATION THROUGH SIMD REGISTERS

(71) Applicant: SAP SE, Walldorf (DE)

(72) Inventors: Maik Goergens, Nussloch (DE); Dominik Durner, Schrobenhausen (DE)

(73) Assignee: SAP SE, Walldorf (DE)

( * ) Notice: Subject to any disclaimer, the term of this patent is extended or adjusted under 35 U.S.C. 154(b) by 229 days.

(21) Appl. No.: 15/261,886

(22) Filed: Sep. 10, 2016

(65) Prior Publication Data

US 2018/0074792 A1 Mar. 15, 2018

(51) Int. Cl.
*G06F 8/30* (2018.01)
*G06F 17/30* (2006.01)
*G06F 12/0897* (2016.01)
*G06F 9/30* (2018.01)
*G06F 9/38* (2018.01)

(52) U.S. Cl.
CPC ............ *G06F 8/30* (2013.01); *G06F 9/30036* (2013.01); *G06F 9/3887* (2013.01); *G06F 12/0897* (2013.01); *G06F 17/30315* (2013.01); *G06F 17/30339* (2013.01); *G06F 17/30386* (2013.01); *G06F 2212/45* (2013.01)

(58) Field of Classification Search
CPC ................. G06F 8/30; G06F 17/30386; G06F 17/30339; G06F 12/0897; G06F 2212/45
USPC ......................................................... 707/754
See application file for complete search history.

(56) References Cited

U.S. PATENT DOCUMENTS

| 5,590,362 | A | * | 12/1996 | Baum | G06F 15/78 |
| 6,411,652 | B1 | * | 6/2002 | Sivan | H04N 19/51 375/240.13 |
| 7,873,812 | B1 | * | 1/2011 | Mimar | G06T 1/20 712/2 |
| 8,099,440 | B2 | * | 1/2012 | Johnson | G06F 17/30519 707/802 |

(Continued)

OTHER PUBLICATIONS

Broneske et al., "Database Scan Variants on Modern CPUs: A performance Study", International Workshop on In-Memory data Management and Analytics, IMDM 2013, IMDM 2014, 15 pages, 2014. (Year: 2014).*

(Continued)

*Primary Examiner* — Phuong Thao Cao
(74) *Attorney, Agent, or Firm* — Buckley, Maschoff & Talwalkar LLC

(57) ABSTRACT

Executable code is generated for processing a request including a predicate associated with a column of a database table. The executable code defines how to process data through a register at the processor associated with single instructions on multiple data. When a number of bit values of the register at the processor is not an aliquot part of a count of rows in the column of the database table, a new column is loaded in the main memory to include the column of the database table and additional number of data elements. The number of bit values of a register section of the register is an aliquot part of a number of elements of the new column. The new loaded column is evaluated iteratively to determine result bit vectors to be loaded in the register. At the processor, result data is determined to correspond to the evaluated section.

20 Claims, 9 Drawing Sheets

(56) References Cited

U.S. PATENT DOCUMENTS

| | | | | |
|---|---|---|---|---|
| 8,572,131 | B2* | 10/2013 | Ellison | G06F 17/30595 707/802 |
| 9,811,548 | B2* | 11/2017 | Stigsen | G06F 17/30371 |
| 9,886,242 | B2* | 2/2018 | Uliel | G06F 8/30 |
| 9,886,459 | B2* | 2/2018 | Chavan | G06F 17/30315 |
| 9,965,501 | B2* | 5/2018 | Ellison | G06F 17/30315 |
| 2007/0239968 | A1* | 10/2007 | Moyer | G06F 9/30014 712/221 |
| 2008/0016320 | A1* | 1/2008 | Menon | G06F 9/30014 712/22 |
| 2008/0046683 | A1* | 2/2008 | Codrescu | G06F 9/30021 712/7 |
| 2008/0114975 | A1* | 5/2008 | Yen | G06F 9/30058 712/233 |
| 2009/0094191 | A1* | 4/2009 | Chaudhuri | G06F 17/30463 |
| 2010/0042587 | A1* | 2/2010 | Johnson | G06F 17/30315 715/243 |
| 2010/0049730 | A1* | 2/2010 | Qiao | G06F 17/30457 707/756 |
| 2011/0078134 | A1* | 3/2011 | Bendel | G06F 17/30312 707/713 |
| 2011/0302151 | A1* | 12/2011 | Abadi | G06F 17/30445 707/714 |
| 2012/0084278 | A1* | 4/2012 | Franke | G06F 17/30587 707/719 |
| 2012/0310916 | A1* | 12/2012 | Abadi | G06F 17/30445 707/713 |
| 2013/0151567 | A1* | 6/2013 | Ellison | G06F 17/30595 707/802 |
| 2013/0151822 | A1* | 6/2013 | Eichenberger | G06F 9/30018 712/234 |
| 2013/0275473 | A1* | 10/2013 | Ellison | G06F 17/30595 707/802 |
| 2013/0290943 | A1* | 10/2013 | Uliel | G06F 9/30032 717/160 |
| 2014/0013076 | A1* | 1/2014 | Ganesh | G06F 17/30315 712/4 |
| 2014/0013077 | A1* | 1/2014 | Ganesh | G06F 17/30315 712/22 |
| 2014/0013078 | A1* | 1/2014 | Ganesh | G06F 17/30315 712/22 |
| 2014/0074818 | A1* | 3/2014 | Barber | G06F 17/30315 707/714 |
| 2014/0173225 | A1* | 6/2014 | Chatterjee | G06F 9/3824 711/158 |
| 2014/0280283 | A1* | 9/2014 | Li | G06F 17/30445 707/764 |
| 2014/0281401 | A1* | 9/2014 | Hughes | G06F 9/30152 712/210 |
| 2015/0026444 | A1* | 1/2015 | Anderson | G06F 9/3802 712/234 |
| 2015/0088844 | A1* | 3/2015 | Stigsen | G06F 17/30312 707/703 |
| 2015/0088926 | A1* | 3/2015 | Chavan | G06F 15/78 707/769 |
| 2015/0277910 | A1* | 10/2015 | Grochowski | G06F 9/30072 712/234 |
| 2015/0277917 | A1* | 10/2015 | Chavan | G06F 9/3887 712/7 |
| 2015/0363456 | A1* | 12/2015 | Raman | G06F 17/30371 707/693 |
| 2016/0011872 | A1* | 1/2016 | Opferman | G06F 9/30145 712/226 |
| 2016/0055004 | A1* | 2/2016 | Grochowski | G06F 9/3005 712/23 |
| 2016/0065657 | A1* | 3/2016 | Ge | H04L 51/36 709/206 |
| 2016/0070726 | A1* | 3/2016 | MacNicol | G06F 17/30315 707/691 |
| 2016/0179537 | A1* | 6/2016 | Kunzman | G06F 9/30036 712/7 |
| 2016/0350375 | A1* | 12/2016 | Das | G06F 17/30463 |
| 2017/0031975 | A1* | 2/2017 | Mishra | G06F 17/30339 |
| 2017/0031976 | A1* | 2/2017 | Chavan | G06F 17/30345 |
| 2017/0046168 | A1* | 2/2017 | Mahurin | G06F 9/3887 |
| 2017/0046412 | A1* | 2/2017 | Levy | G06F 17/30442 |
| 2017/0091239 | A1* | 3/2017 | Bumbulis | G06F 17/30324 |
| 2017/0102947 | A1* | 4/2017 | Opferman | G06F 9/30123 |
| 2017/0147225 | A1* | 5/2017 | Geissinger | G06F 3/0608 |
| 2017/0300455 | A1* | 10/2017 | Ganesh | G06F 17/30315 |
| 2017/0371927 | A1* | 12/2017 | Ramesh | G06F 17/30454 |
| 2018/0075105 | A1* | 3/2018 | Chavan | G06F 17/30507 |
| 2018/0144006 | A1* | 5/2018 | Chavan | G06F 15/78 |

OTHER PUBLICATIONS

Johnson et al., "Row-wise Parallel Predicate Evaluation", Proceedings of the VLDB Endowment, vol. 1, Issue 1, Aug. 2008, pp. 622-634. (Year: 2008).*

Li et al., "BitWeaving: Fast Scans for Main Memory Data Processing", SIGMOD' 13, Jun. 22-27, 2013, New York, New York, USA, 12 pages. (Year: 2013).*

Willhalm et al., "SIMD-Scan: Ultra Fast in-Memory Table Scan Using on-Chip Vector Processing Units", Proceedings of the VLDB Endowment, vol. 2, Issue 1, Aug. 2009, pp. 385-394. (Year: 2009).*

Zhou et al., "Implementing Database Operations Using SIMD Instructions", Proceedings of the 2002 ACM SIGMOD International Conference on Management of Data, Madison, Wisconsin, Jun. 3-6, 2002, pp. 145-156. (Year: 2002).*

Extended European Search Report to EP Application No. 17001114.2; completed Nov. 27, 2017; Munich; 8 pages.

Maik Goergens et al.; "Iterative Evaluation of Data Through SIMD Processor Registers"; US Utility Application; U.S. Appl. No. 15/261,883, filed Sep. 10, 2016; 52 pages.

Thomas Willhalm et al; "Vectorizing Database Column Scans with Complex Predicates"; Conference: ADMS, At Riva del Garda, Italy, 2013; appears in vol. 2014; 12 pages; (http://www.adms-conf.org/2013/muller_adms13.pdf).

* cited by examiner

LOADING DATA FOR ITERATIVE EVALUATION THROUGH SIMD REGISTERS

FIELD

The field generally relates to data processing, to database systems and computer processors.

BACKGROUND

A computer program can be written in a form of programming language, including compiled or interpreted languages. The computer program can be deployed as a standalone program or as a module, or other unit suitable for use in a computing environment. The computer program can be deployed to be executed on a computer or distributed across multiple computers interconnected by a communication network. Operations may be performed by one or more programmable processors executing the computer program to perform functions by operating on associated data and generating output.

Sets of data and program instructions (e.g. software, computer programs) may be stored on storage units and reside within the main memory and/or within the processor during execution by a computer system. Processing program instructions on the computer system includes manipulations and transformations of data within the processor registers and memory into other data, similarly represented as physical quantities within the memory or registers or other information storages. Program instructions may be based on defined queries for data stored in databases on the computer system. A query statement may be used to query the database and retrieve selected data that match specified criteria. A processor register is a quickly accessible location available for the processor on the computer system. Registers usually include an amount of fast storages, they may have specific hardware functions, and/or the access to the registers may be restricted, e.g. read-only, write-only, etc.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for loading data for iterative evaluation through registers associated with single instructions on multiple data, are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
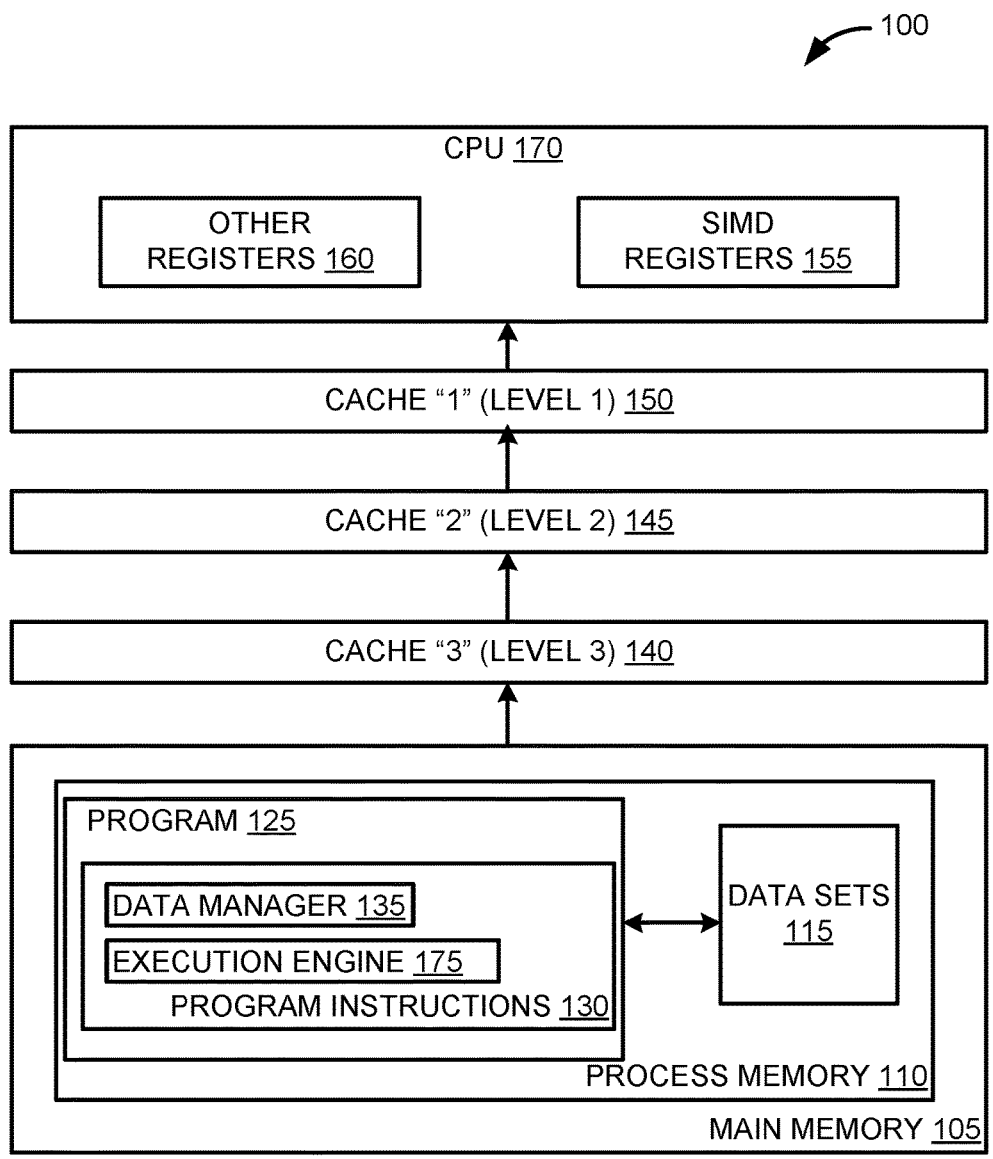
FIG. 1 is a block diagram illustrating an exemplary environment for evaluating data associated with a program in an in-memory database system, according to one embodiment.

FIG. 1 is a block diagram illustrating an exemplary environment 100 for evaluating data associated with a program in an in-memory database system, according to one embodiment. The exemplary environment 100 includes main memory 105, cache memory, and a central processing unit (CPU) 170. The main memory 105 may store instructions and data, which may be associated with one or more programs for execution in the in-memory database system. Program 125 is defined to run on process memory 110 in the main memory 105. The process memory 110 is managed by an underlying operating system (OS) (not illustrated) running in the exemplary environment 100. The program 125 may be a software program, which may be designed and developed with different development tools and techniques. The program 125 includes program instructions 130. The program 125 may be associated with operations defined in the program instructions 130 that are related to data sets 115. The data sets 115 may be stored in a database table. The program instructions 130 include a data manager 135 and an execution engine 175. The data manager 135 maintains data, which is generated through the execution of the program instructions 130 by the execution engine 175. The data manager 135 may be used when loading data, where the data is referred to from the program instructions 130 and/or when utilizing data, required for the execution of instructions. The execution engine 175 generates code during runtime based on the program instructions 130. The generated code defines how data from data set 115 is processed through a register associated with single instructions on multiple data (SIMD register) 155 of the CPU 170.

In one embodiment, the program instructions 130 may define operations for querying data to generate a result data set. For example, the instructions may be defined based on a request defining a query. The query is defined as a query string in a query language, e.g. Structured Query Language (SQL) to manage data held in databases. Table 1 presents an exemplary request for querying data from a database table-table "T", designed in SQL. Table 2 presents the data stored in the database table "T". The presented request as an SQL string may be associated with a program, such as the program 125. The program 125 processes the received request with the SQL string.

TABLE 1

Select a
From T
Where b> 100;

TABLE 2

| a | b | c |
|---|---|---|
| 14 | 5 | Product 1 |
| 21 | 3 | Product 2 |
| 13 | 101 | Product 3 |
| 16 | 90 | Product 1 |
| 14 | 102 | Product 3 |

The defined program instructions 130 in the program 125 may be evaluated and executed. For example, if the program instructions 130 are associated with the SQL string presented in Table 1, then when executing the program 125, the data set 115 is filtered based on the values for column "b". The execution engine 175 generates an executable program based on the program 125 that performs the filtering over the values for column "b" to determine a result set of data from the values from column "a". If the instructions are related to the data set presented in Table 2, then column "b" may be filtered based on the predicate "b>100" as defined in the where clause. Values from column "a" corresponding to values from column "b", which comply with the predicate, are determined. The result data includes the values "13" and "14" of column "a" corresponding to values "101" and "102" from column "b", which are higher than 100.

In one embodiment, when executing the program instructions 130 from the program 125, cache memory for the CPU 170 is used to store program instructions or data that are frequently referenced by program 125 during operation. Fast access to these instructions and data increases the overall speed of the program execution. The CPU 170 may be associated with cache memory in three cache levels—cache "1" 150, cache "2" 145, and cache "3" 140. The CPU 170 includes registers, including single instruction multiple data (SIMD) registers 155 and other registers 160. The registers are quickly accessible locations available to the CPU 170. The registers may hold values transferred from the main memory 105 through the cache memory levels—cache "3" 140, cache "2" 145, and cache "1" 150, to reach the registers. Data in the registers may be stored while executing program instructions, such as program instructions 130.

The SIMD registers 155 are associated with performing single instructions on multiple data elements in parallel. Therefore, within such SIMD registers 155, a common operation as defined in the program instructions (e.g., 130) is performed on multiple data elements simultaneously, instead of iterating in a scalar manner over lines in a table. The other registers 160 may store values generated based on program instructions, defining data iteration in a scalar manner.

Figure 2A:
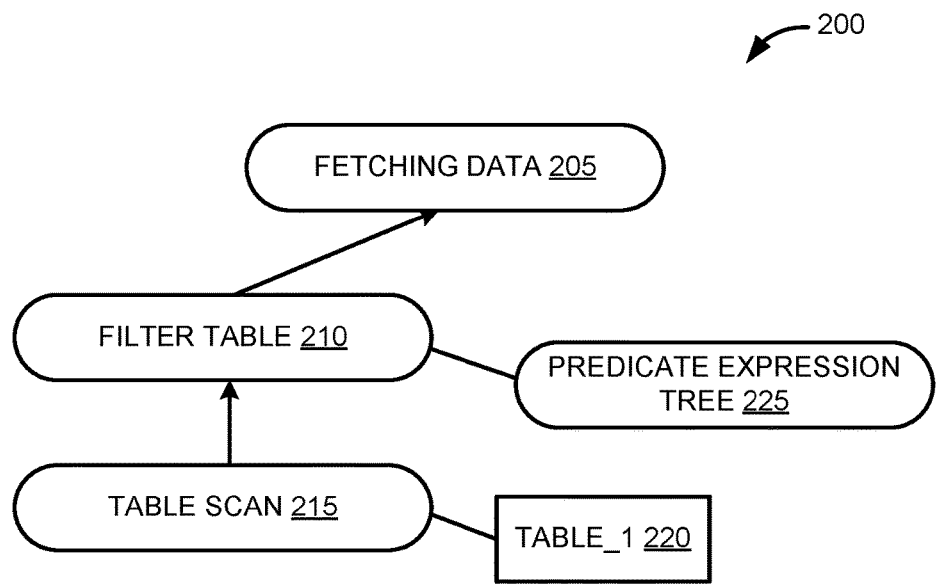
FIG. 2A is a flow diagram illustrating a process for logically evaluating program instructions from a program executed in an in-memory database system, according to one embodiment.

FIG. 2A is a flow diagram illustrating a process 200 for logically evaluating program instructions from a program executed in an in-memory database system, according to one embodiment. In one embodiment, the program may be such as the program 125, FIG. 1. The program may include program instructions defining operations associated with manipulating and/or evaluation data from data sets. The program instructions may be associated with operating over data stored in database tables. The program instructions may be associated with a request for querying data from a database table. Based on the instructions, a table scan operation 215 is performed in relation to table_1 220. For example, the table_1 220 may be such as table "T" discussed in relation to FIG. 1 and represented in Table 2 above. The program instructions may be associated with an SQL string defining a query for table "T", with a defined "where" clause. The program instructions may be associated with the SQL string presented in Table 1. Based on the program instructions, the table_1 220 is filtered at 210, according to the program instructions.

The program instructions may include expressions to be applied for evaluating the data in table_1 220, for example to filter the data. With the example of the SQL string from Table 1 and table_1 220 corresponding to Table 2, the "where" clause filters rows from the table_1 220, where "b" values are greater than 100. The filter table 210 step is associated with a predicate expression tree 225. The predicate expression tree 225 may be generated based on evaluation of the instructions defined in the program. The expression tree may represent program instructions in a tree-like data structure, where nodes represent method call, binary operations, data values, etc. The expression tree may be a binary tree where internal nodes correspond to operators and leaf nodes correspond to operand. Based on the filtering (at 210), data corresponding to the defined program instructions is fetched at 205. Therefore, the defined data flow in the process 200 is defined from the bottom of the process to the top, starting with the table scan 215 and ending with the fetching data 205.

Figure 2B:
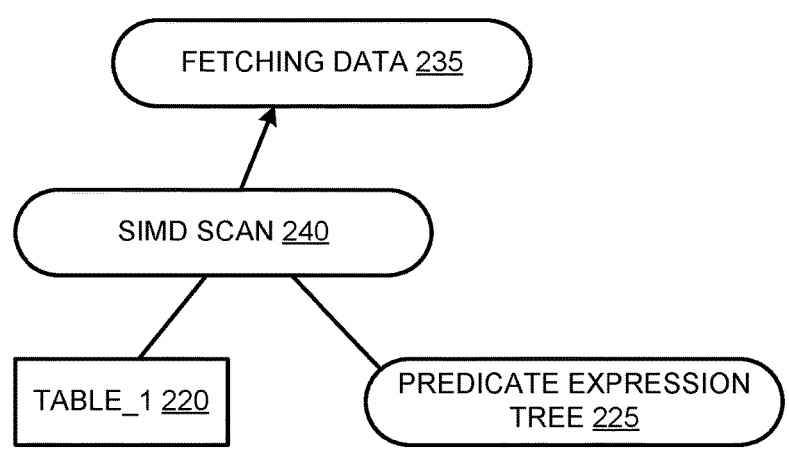
FIG. 2B is a flow diagram illustrating a process for plan generation for executing program instructions from a program, according to one embodiment.

FIG. 2B is a flow diagram illustrating a process 230 for plan generation for executing program instructions from a program, according to one embodiment. Based on the process 200 defining a logical plan for evaluation of program instructions from a program, the plan for execution of the program instructions is generated. When executing the program instruction from the program, registers from the CPU may be utilized to enhance the performance of the program. The registers may be SIMD registers, such as the SIMD registers 155 (FIG. 1). To utilize the SIMD registers, the process 230 may be defined for code generation that allocates processed data into the SIMD registers. A SIMD scan 240 may be defined for table_1 220 (as described in process 200). The SIMD scan 240 corresponds to the predicate expression tree 225 defined for the operations from the program instructions. Based on the SIMD scan 240, fetching of data 235 is performed. The fetching of data is processed in a SIMD manner, so that fetched data is processed into correspondingly defined SIMD registers. SIMD registers allow one microinstruction to operate at the same time on multiple data items, for example on multiple data values from multiple rows in a database table. What usually requires a repeated succession of instructions can be performed with one instruction to enhance the performance and computation time.

Figure 3:
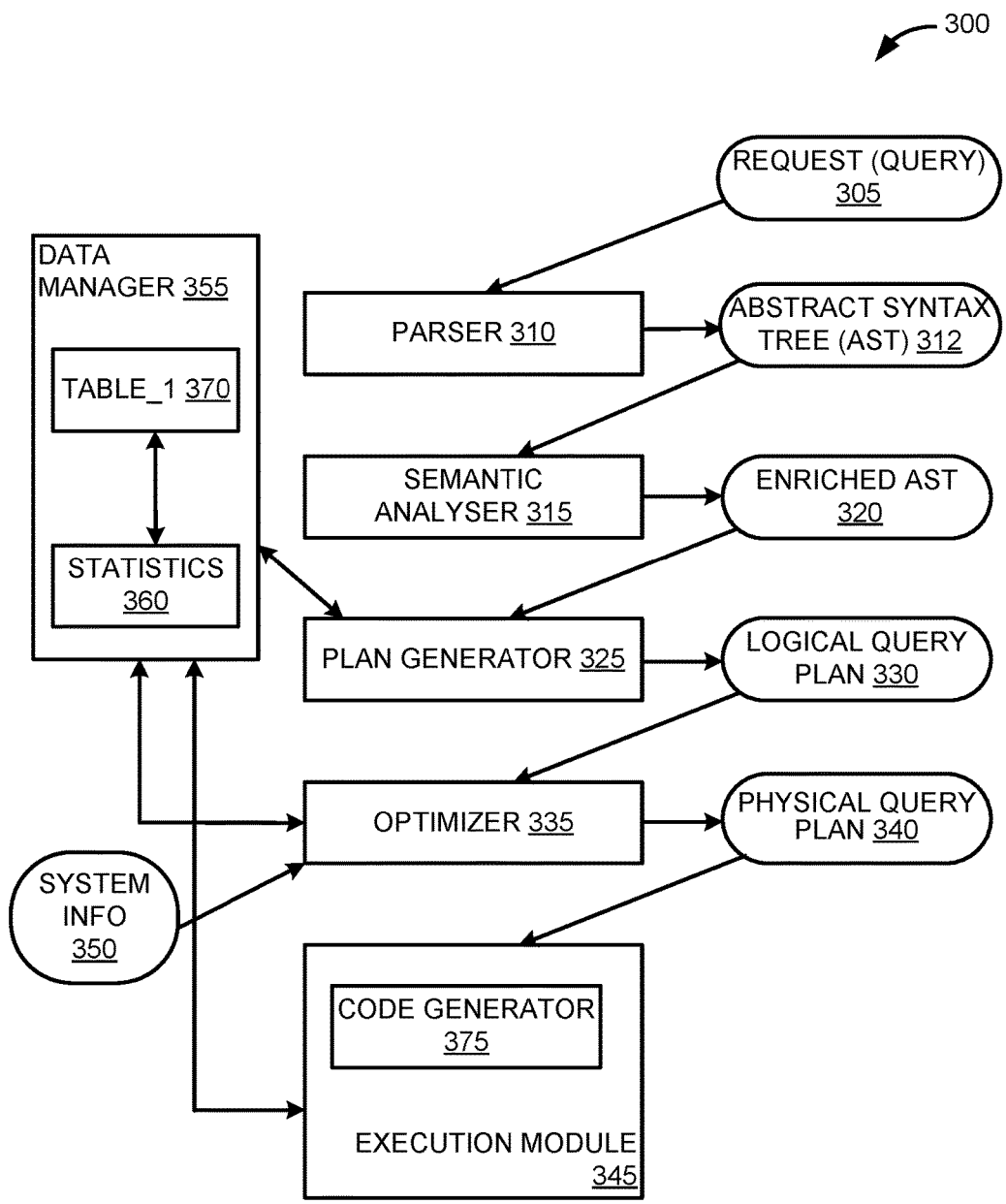
FIG. 3 is a flow diagram illustrating a process for evaluation of a request to be executed in an in-memory database system, according to one embodiment.

FIG. 3 is a flow diagram illustrating a process 300 for evaluation of a request 305 to be executed in an in-memory database system, according to one embodiment. The request 305 may be a query associated with a data set in the in-memory database system. Based on such a request a program, such as program 125, FIG. 1 may be defined. The request 305 may include expressions defining generation of results based on the associated data sets, for example stored in a database table. The request 305 may be associated with a table_1 370. The table_1 370 may include data, such as the data presented in Table 2. The request 305 may include an SQL query for data in table_1 370, which query may include predicates and expressions defining rules for generating result data through querying the table_1 370. The SQL query may be such as the SQL query presented in Table 1. The request 305 is received as statements by the parser 310. The request 305 is read and analyzed by the parser 310 to generate an abstract syntax tree (AST) 312. In the AST 312, statements from the request 305 are logically divided and located into a tree structure positioning operands and operators along tree branches.

The parser 310 sends the generated AST 312 to a semantic analyzer 315, which generates an enriched abstract syntax tree (AST) 320. The semantic analyzer 315 validates the received AST 312 from the parser 310 in the context of the defined table_1 370. The validation of the AST 312 includes determination of whether the defined operands and operators are logically constructed to be validly performed over the data from table_1 370. Based on the validation, the semantic analyzer 315 updated the AST to generate the enriched AST 320, which additionally includes metadata for the data in the table_1 370. For example, the enriched AST 320 may include information about the number of rows in the table_1 370, the type of data stored in a specific column from the table_1 370, etc. A plan generator 325 received the enriched AST 320 from the semantic analyzer 315 to generate a logical query plan 330 for the request 305. The plan generator 325 takes the enriched AST 320 and translates it into a logical query plan 330 defining steps based on the enriched AST 320. The logical query plan 330 may correspond to the process 200, FIG. 2A, where table_1 220 corresponds to table_1 370.

Based on the defined logical query plan 330, an optimizer 335 determines a physical query plan 340. In an example, the determined physical query plan 340 may be interpreted to generate a result data set. In another example, the determined physical query plan 340 may be used for code generation for execution of the request 305. The optimizer 335 is coupled to the data manager 355 to receive information about the data stored in table_1 370. The optimizer 335 receives statistics 360 for the data from table_1 370 through the data manager 355. For example, such statistics 360 include minimum and/or maximum values for data in a column, a number of rows in a table, a number of columns in a table, and other statistical indicators for the data in table_1 370. Further, the optimizer 335 receives system information 350 about the system environment, where the program instructions 305 are to be executed. In such manner, the optimizer 335 receives information about the capabilities of the engine, where the program instructions 305 are executed, and information about the data, which will be processed according to the program instructions 305. The optimizer 335 may generate a set of physical plans, based on the received system information 350 and the statistics 360.

A plan from the set of physical query plans may be a code generation plan. The optimizer 335 may determine an optimal physical plan for code generation, based on the input from the data manager 355 and the system info 350.

The physical query plan 340 for code generation may be provided from the optimizer 335 to an execution module 345, which may execute runtime generated program instructions defined by a code generator 375. The execution module 345 performs the operations defined by the request 305 and transfers data from table_1 370 from the main memory of the in-memory database system through the cache memory levels and up to the SIMD registers in the processor, as described in relation to FIG. 1.

The execution module 345 includes the code generator 375, which may generate executable code in compiled form for the received request 305 that utilize SIMD registers, such as the SIMD registers 155, FIG. 1, while processing data from table_1 370. The code generator 375 may define how data from table_1 370 may be evaluated based on operations and predicates defined in the request 305. The code generator 375 utilized the physical query plan 340, provided by the optimizer 335 to generate code during runtime, which defined what kind of registers from the processor to be used during processing data as defined in the request 305. A code generation plan may be designed to optimize the allocation of data into register, and may further define to utilize SIMD registers to increase performance of the execution of the program.

When the code generator 375 is associated with utilizing SIMD registers for processing data, then the generated code may further define how to separate and divide the processed data to optimize the execution of the process. The program instructions 305 may define operations associated with a large amount of data stored in table_1 370, which may not be processed at once through the SIMD registers at the processor. Therefore, the data from table_1 370 may be processed in subsets, which subsets may be defined as sections of rows. These subsets or sections may be defined to correspond in size to the size of SIMD registers. Therefore, the size of the SIMD registers may be determined and received as part of the system information 350. In some embodiments, the optimizer 335 may determine the size. In some other embodiments, the optimizer 335 may check to determine whether a SIMD register exists and if it is available. The code generator 375 may be used to determine the size of the SIMD registers and select which SIMD registers are to be used.

The code generator 375 may generate code during runtime that utilizes memory of SIMD registers. Table 3 includes exemplary pseudo runtime generated code based on a received SQL string, such as the SQL string in Table 1, associated with a table, such as Table 2. For the example in Table 3, it is assumed that the size of a SIMD register is 256 bits. Therefore, the iteration are performed over sections "i" including 256 numbers each. The Pseudo code example is defined as an artificial and informal language that helps understanding the code generation. Pseudo code is a "text-based" detail algorithmic design of the runtime generated code.

TABLE 3

```
int *a;
int *b;
for (i = in 256 number sections)
{
    for ( # of simd_passes)
```

TABLE 3-continued

```
{
    load (b -> simd_register)
    compare_gt ( simd_register, 100);
    // bit vector of length 8 bits
    // store in result_vec at right position
}
for (j= ones in bitvector)
    {
        calculate original row_id = i* 256 + j;
        return_to_user (a[row_id]);
    }
}
```

Figure 4:
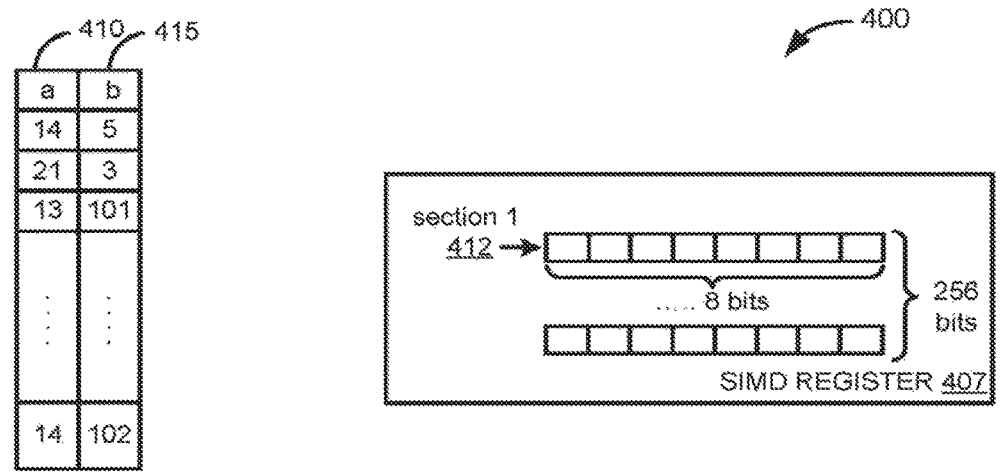
FIG. 4 is a block diagram illustrating exemplary data structures associated with a process for evaluating a request related to a data set through iterating over sections of the data set within registers at a computer processor, according to one embodiment.
Figure 4:
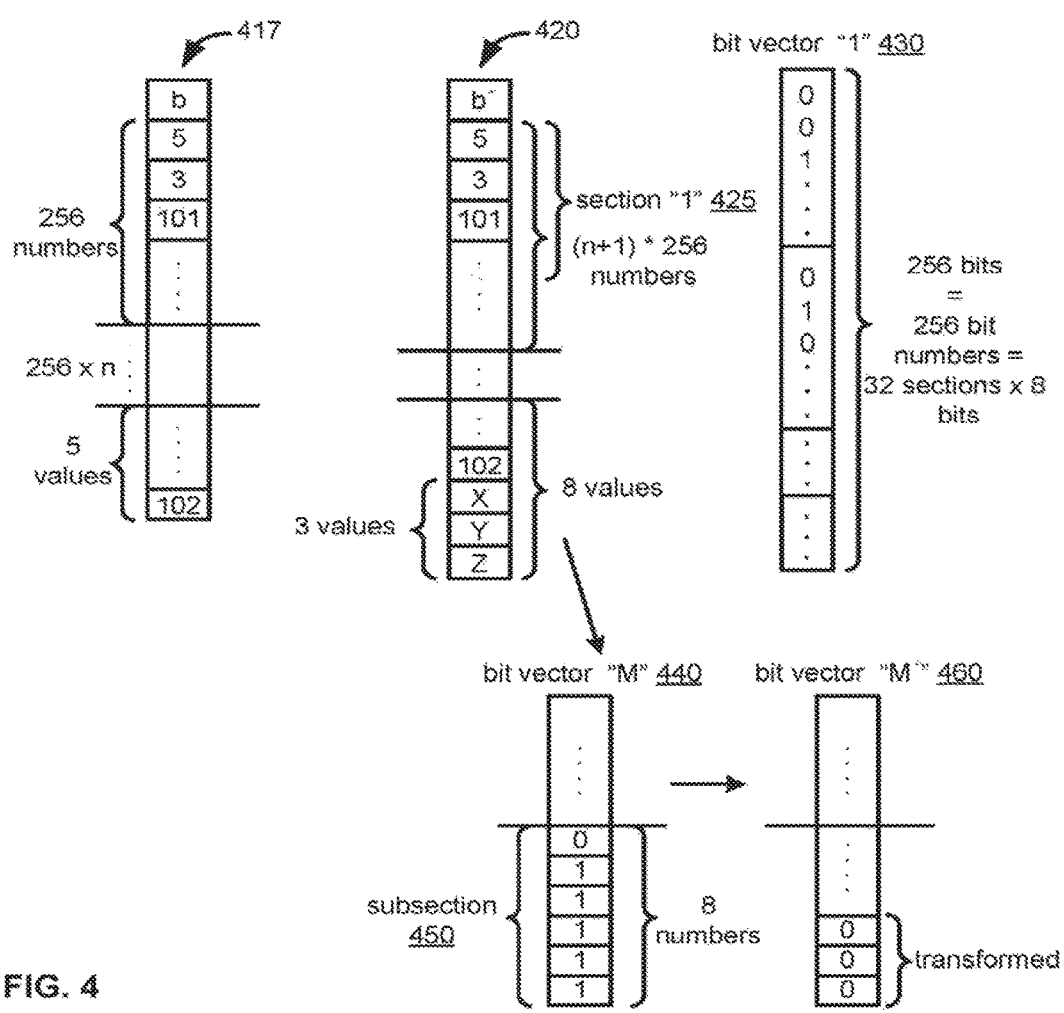

FIG. 4 is a block diagram 400 illustrating exemplary data structures associated with a process for evaluating a request related to a data set through iterating over sections of the data set within registers at a computer processor, according to one embodiment. Table_1 405 is a table including data for column "a" 410 and column "b" 415. Table_1 405 may be similar to Table 2 presented above in relation to FIG. 1, but including column "a" and column "b" without column "c".

The request may include one or more queries for table_1 405. For example, a query may be such as the query defined in Table 1. Based on querying the data in table_1 405, values from column "a", where values in "b" are greater than 100 can be determined. The defined request may be evaluated to determine a code generation plan, as discussed in relation to FIG. 3. The code generation plan may define that values from column "b" are evaluated in sections through process registers to optimize the performance. The values from column "b", as presented in array 410, may be evaluated iteratively into sections based on a predicate defined in the program instructions for evaluating the data. In the exemplary query from Table 1, the predicate is defined in the where clauses—"b>100". The array 417 of values from column "b" may be divided into sections. The section size may correspond to the size of an SIMD register 407 at the computer processor of the computer system, where the program is executed. The size of the SIMD register 407 may be determined. For example, the SIMD registers may have a set of register sections of 8 bits to define a register of a size of 256 bits. The set of register sections is of equal size. A section "1" 412 of the SIMD register 407 is defined to comprise 8 bits. In the SIMD register 407 of 256 bits, 256 bit values may be included, which may correspond to an evaluation result for 256 numbers from the array 410 based on the predicate defined in the program instructions, namely "b>100".

A set of sections of data elements from array b 417 is defined. A number of elements allocated into a size may be determined to correspond a number of bit values to be allocated into the SIMD register 407. A first section from array b 417 is determined to include 256 numbers. For example, the SIMD register's size may be 256 bits and the values from array b 417 are 32 bit wide values (integer or float). For array b 417, further subsequent n sections of 256 numbers are determined. After the n+1 sections of 256 number, 5 more values are defined in the array b 417. 8 (8 bits per section) is not an aliquot part of 5. Based on array b 417, as a corresponding array to column "b' 415, a new column "b'" 420 is determined. The column "b" 415 includes the elements from array b 417 and additional elements. The number of additional elements is 3. The number of additional elements is determined so that the number of bit values defined for a register section, 8 bit values in 8 bits, is an aliquot part of the total number of elements in column "b'" 420. As 8 is an aliquot part of 256, and 5 is not an aliquot part of 8, next to the latest 5 values, additional 3 values are to be includes, so that 8 values are included in the column "b'" 420 and 8 is an aliquot part to the total number of elements is aliquot to 8. The additional values may be defined arbitrary, for example, they may be of the same type as the data stored in column "b" 415. The number of values located in array 417 is an exemplary number. Different numbers may be determined and the number of additional elements to be included in the column "b'" 420 may vary in the range of 1 to 7, when there is a subsection of array 417, where the number of bit values from the register section is not an aliquot part of the number of elements in array 417.

Based on the new column "b'" 420, a set of sections is defined. The sections are defined to include 256 values. A first section—section "1" 425 is determined. The values from the first section 425 are evaluations based on the predicate defined in the program instructions. As a result of the evaluation, a first result vector—bit vector "1" 430 is determined. The first result vector—bit vector "1" 430 includes 256 bit values and is of a size equal to 256 bit (the SIMD register' size). The first result vector—bit vector "1" 430 includes 32 sections of 8 bits to store 0 and 1 values.

The bit vector "1" 430 is defined to include bit values corresponding to the evaluation results for the values from section "1" 425 of column "b'" 420. The bit vector "1" 430 is stored in the SIMD register 407. The bit vector "1" 430 in the SIMD register 407 may be divided into register sections, such as the register section 412. Based on determined values in the bit vector "1" 430, a result output data may be defined. For example, based on a position of positive bit values (equal to 1) in the bit vector "1" 430, corresponding values from column "a" from the table_1 405 may be defined. Iteratively, further bit vectors may be defined to correspond to further sections of 256 values defined in column "b'" 420 generated for column "b" in Table_₁ 405.

Based on the determined values for the bit vector "1" 430, the SIMD register 407 is filled in with values of 0 and 1. The "0"-s correspond to values from b, where the condition defined in the predicate from the program instructions is not satisfied. The "1"-s correspond to values from b, where the condition defined in the predicate from the program instructions is satisfied. Based on the "1"-s, which may be interpreted as positive bit values, corresponding rows from the column "a" 410 may be determined to generate a first set of result data. The first set of result data corresponds to the first section "1" 425 that is evaluated. The result data is determined based on the program instruction and the defined query. In the example with query from Table 1, the result data is associated with column "a" 410. The first set of result data may be communicated by the processor. For example, the first set of result data may be communicated via a user interface on a display screen associated with the computer system.

During a second iteration, a second bit vector may be generated to replace the first bit vector in the SIMD register, where bit values evaluating a second section from the column "b" 420 may be defined. Based on the positive bit values in the second bit vector, corresponding values in column "a" may be defined. Iteratively, all of the sections defined in the array 410 may be evaluated to determine bit vectors, such as bit vector "1" 430 to be stored one after another into the SIMD register 407 at the processor. In such iterative manner, the results that are provided are provided in pieces, based on the results generated in the SIMD register. Therefore, the results from the evaluation of a given section from column "b'" may not be pushed back into the main memory of the computing environment.

The column "b'" 420 may include n+1 sections of 256 values and further additional m subsections of 8 values, where the additional m subsections of 8 values comprise less than 256 values. In such a case, the m subsections are evaluated based on the defined predicate, and a result bit vector is determined. The result bit vector is smaller in size compared to the size of the SIMD register 407. The size of a register section is an aliquot part of the size of the m subsections from column "b'" 420.

At a last iteration, the latest section from column "b'" 420 includes 3 additional values. In one example, the latest section may be of a size of 256 values. In another example, the latest section may be of a smaller size, and may include m subsections comprising 8 values per subsection. These 3 additional dummy values are located at a latest subsection of 8 values. The 3 additional dummy values are to be evaluated according to the defined predicate in the program instructions to determine whether they comply with the predicate. However, as they are additionally added values, which are not presented in the original data from Table_1 405, the result bit values determined for these additional values are irrelevant for the final result. Therefore, when a latest section of column "b'" 420 is evaluated to determine a result bit vector, for example, bit vector "M" 440, the latest 3 bit values are determined to be positive. When there are positive bit values determined for such additionally added elements, then the bit vector "M" 440 may be reevaluated and transformed into bit vector "M" 460. If the bit vector "M" 440 includes 32 subsections of 8 bits, then the $32^{nd}$ section is subsection 450. Subsection 450 includes bit values corresponding to evaluation of the additional dummy values (X, Y, and Z from column "b'" 420). Then, bit vector "M" 460 is defined to include the bit values from bit vector "M" 440, where the latest three bit values from section 450 are transformed to zeros. Such transformation for settings bits to zeros is performed just once when the final bit vector is determined.

The process of evaluating a request may be related to a complex predicate including one or more simple predicates (e.g. the one described above "b>100") for evaluation of data from a database table. For example, a complex predicate may be in the following for: WHERE (s>10 AND t<20) OR (u=30 AND v>40). The parameters s, t, u, and v may be denoting columns from the database table. The exemplary complex predicate includes four simple predicates. For such a complex predicate, a bit vector b1 of size 256 for the first predicate "s>10", and a bit vector b2 of size 256 for the second predicate "t<20", and so on for b3 and b4. Then, the four bit vectors can be taken and do the junctions in a "SIMD" fashion. SIMD operations may be performed where there are defined junctions in the originally defined complex predicate. For example, the performed SIMD operations may be performed over the bit vectors such as (b1 SIMD_AND b2) SIMD_OR (b3 SIMD_AND b4). In such a manner, the "AND" and "OR" operations for 256 rows are performed with only 3 SIMD instructions, instead of 256*3 instructions required to be executed if performed in a scalar manner. Since the predicate evaluation closely is closely coupled with the rest of the execution, table data and bit vectors are not transferred up and down through the cache levels. As part of the data from the evaluated columns with the SIMD operations are dummy values, the result bit vector may be reevaluated once it is determined the final result for the vector ((b1 SIMD_AND b2) SIMD_OR (b3 SIMD_AND b4)). Thus, the determined bit values for the additional numbers are corrected and set to zeros (negative bit values).

Figure 5:
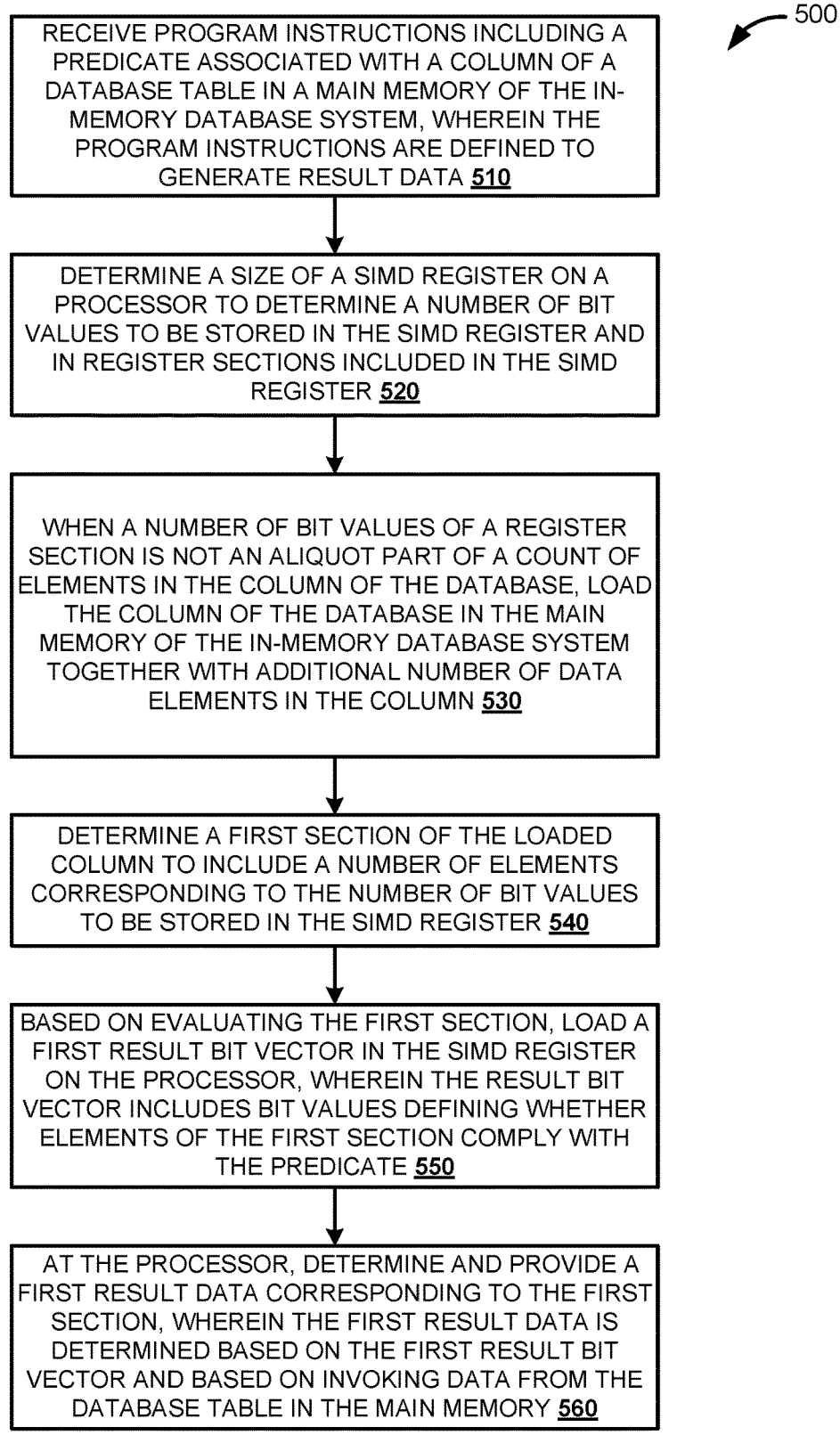
FIG. 5 is a flow diagram illustrating a process for iterative evaluation of data through processor registers, according to one embodiment.

FIG. 5 is a flow diagram illustrating a process 500 for iterative evaluation of data through processor registers, according to one embodiment. At 510, executable code generated based on program instructions is received. The program instructions include a predicate associated with a column of a database table in a main memory of an in-memory database system. The executable code that is generated may define that processing of data is performed through process registers that are related to single instructions on multiple data. The executable code defines that all of the data that is referred to is processed in a common manner through a SIMD register on the processor in iterative manner. At 520, a size of the SIMD register on the processor is determined. The size of the SIMD register is used to determine a number of bit values to be stored in the SIMD register and in register sections included into the SIMD register. The SIMD register may correspond to the SIMD register 407 and the section "1" 412 of the SIMD register 407 from FIG. 4.

At 530, when a number of bit values of a register section is not an aliquot part of a count of rows in the column of the database that is associated with the predicate, a new column is loaded at the main memory. The new column includes the column of the database together with additional number of data elements to be included in the new column. The inclusion of new additional number of data elements in the new column may correspond to the suggested definition of a new column "b'" 420 based on array b 417 in FIG. 4. At 540, a first section of the loaded new column is determined. The first section of the loaded new column includes a number of elements corresponding to the number of bit values to be stored in the SIMD register. At 550, based on evaluating the first section, a first result bit vector is loaded in the SIMD register. The first result bit vector includes bit values defining whether elements of the first section comply with the predicate. At 560, at the processor, a first result data is determined and provided. The first result data corresponds to the first section that is evaluated. The first result data is determined based on the first result bit vector and based on invoking data from the database table in the main memory. The data invocation may be performed based on identified row identifiers for the database table, which correspond to positive bit values in the first result bit vector. The row identifiers may be determined based on the fact that the evaluated first section of the loaded column is a first iteration of evaluation and based on a position of positive (equal to 1) bit values in the first result bit vector.

Figure 6:
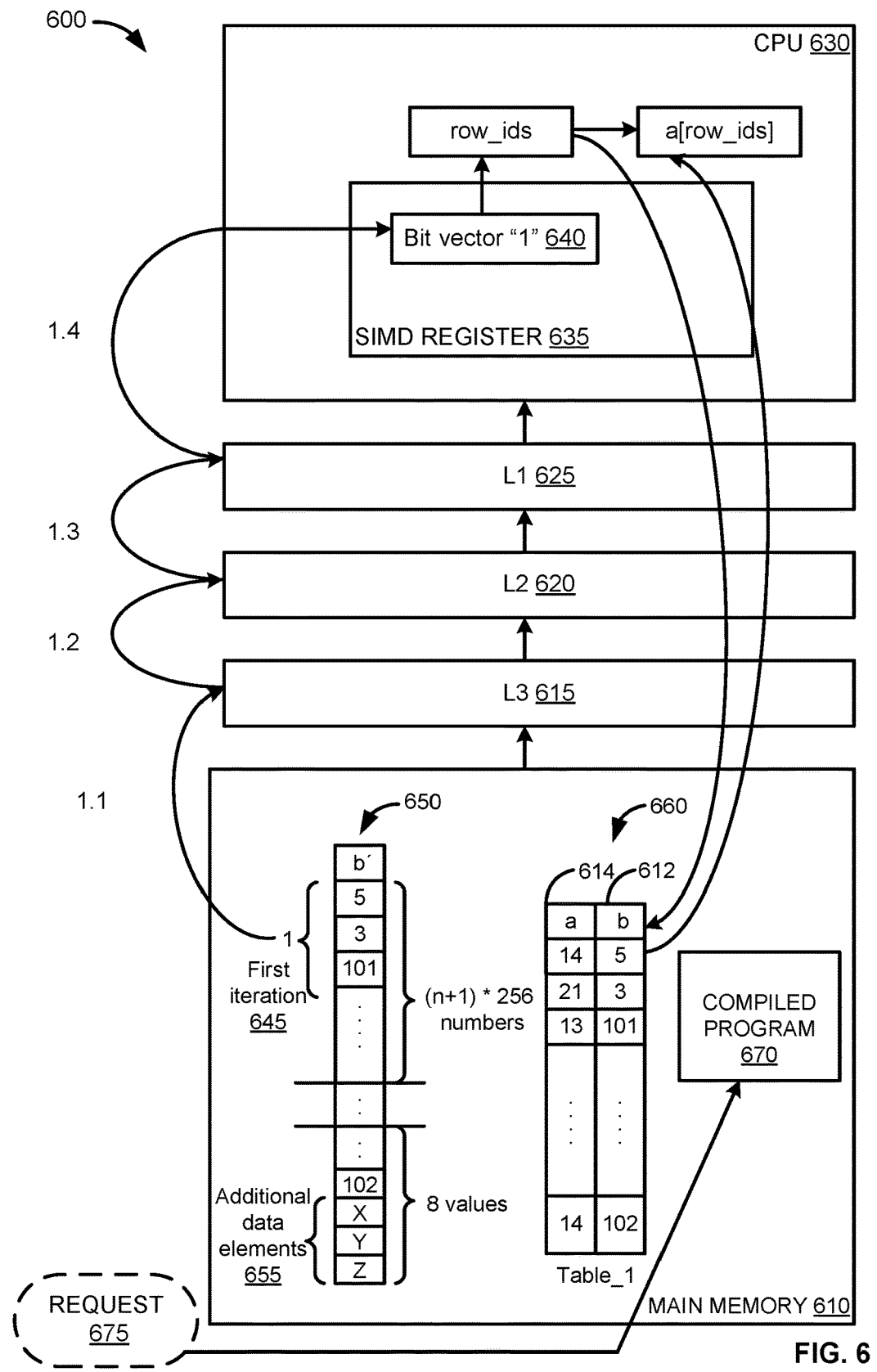
FIG. 6 is a block diagram illustrating a system for evaluating program instructions related to operations over a data set through processor registers, according to one embodiment.

FIG. 6 is a block diagram illustrating a system for evaluating program instructions related to operations over a data set through processor registers, according to one embodiment. The system 600 includes main memory 610, three cache memory levels—L1 625, L2 620, and L3 615, and a CPU 630. The main memory 610 includes a compiled program 670. The compiled program 670 may be a compiled version of the program 125, FIG. 1. The compiled program 670 may based on a received request 675. The request 675 may be such as the request 305, FIG. 3. The request 675 may be defined as a query, for example an SQL string such as the query from Table 1. The compiled program 670 is based on program instructions, such as the described program instructions 130, FIG. 1. The compiled program 670 may be generated by an execution engine, such as the execution engine 175, FIG. 1. The program 670 may be associated with a data set, for example stored in Table_1 660. The Table_1

660 may include a set of columns, for example—column "a" 614, and column "b" 612. The Table_1 660 may be such as the Table 2 presented above. The compile program 670 may define how to use data from the data set in Table_1 660 to generate result data and provide it to an end user. The generated result data may be provided through the CPU 630.

In one embodiment, a column from the Table_1 660 may be associated with a predicate defined in the program instructions from program 670. The column may be column "b". The predicate may be defined in a query. For example, the query may be defined as an SQL string: "select a, where b>100, from table_1". Colum "b" 612 may be evaluated iteratively in sections during executing runtime-generated code for the program 670. The iterative evaluation of the data in column "b" 612 is performed according to the defined predicate to determine whether the values comply with the predicate. The column "b" 612 is evaluated to determine whether the number of bit values to be stored in a register section of the SIMD register 635 is an aliquot part of the number of elements in column "b" 612. If the number of bit values is not an aliquot part of the number of elements in the column "b" 612, load column "b'" 650 to include additional data elements 655. The inclusion of the additional data elements 655 may correspond to the inclusion of 3 values in new column "b'" 420 in FIG. 4. Alternatively, if the number of bit values in the register section is not an aliquot part of the number of elements in the column "b" 612, a data manager (such as the data manager 355, FIG. 3) may include additional logic to prepare and provide arbitrary elements that are accessible after the elements included in the columns of the table. The data manager handles the requirement to provide such a number of elements associated with the column "b" 612. Then, column "b" 612 may be evaluated as the data manager provides the columns from Table_1 660 together with the additional arbitrary elements.

In yet another embodiment, if the number of bit values in the register section is not an aliquot part of the number of elements in the column "b" 612, a latest data section from column "b" 612, which does not contain as many elements as the size of the SIMD register may be loaded in a scalar way. In such scalar manner, the SIMD register may be filled in with elements from the column "b" 612. The filling in with elements may be performed value by value and a part of the SIMD register may be left untouched and not occupied with any values, as there are no corresponding elements in the column "b" 612.

The values in column "b'" 650 may be divided into data sections, so that result bit values from evaluation of a section may fit into a SIMD register 635 at the CPU 630. The data section size, namely the number of values from column "b", may be defined to correspond to the size of the SIMD register 635. At a first iteration 645, a first section from column "b'" 650 may be evaluated based on the program instructions. The values from the first section may be evaluated to determine whether they comply with the defined predicate. The evaluation of the values during the first iteration utilize the cache memory levels L1 625, L2 620, and L3 615, to store data through intermediate operations. The evaluation results for the first section during the first iteration 645, are stored at bit vector "1" 640 at the SIMD register. The bit vector "1" 640 may be such as the bit vector "1" 430 on FIG. 4. In the bit vector "1" 640 a latest section of bit values corresponds to the additional data elements 655 added into the new column "b'" 650.

Based on the values stored at the bit vector "1" 640, row identifiers corresponding to rows from table 660 may be defined. The row identifiers (row_ids), which may be determined are associated with positive bit values from the bit vector "1" 640, which correspond to rows in the table 660 where the predicate is satisfied. As the new loaded column "b'" 650 includes additionally added dummy values 655, the determine bit values in the latest loaded bit vector "1" 640 corresponding to the latest iteration, may include bit values that do not correspond to existing values from the initial Table_1 660. Therefore, bit values corresponding to the additional data elements 655 are transformed into negative bit values (0 values).

When row identifiers are determined for the first iteration, the table 660 may be queried to provide a first result data set corresponding to the first section of column "b" 650. The first results data set may be invoked from the main memory and provided through the CPU 630. The first result data set may include values from column "a", which values are invoked based on determined row identifiers.

At a subsequent iteration, the SIMD register 635 may erase the previously stored bit vector "1" 640 and allow for a subsequent bit vector to be stored there. During a subsequent iteration, the row identifiers that are to be determined may not correspond to the consecutive number of a value from the bit vector. A formula may be used to determine the row identifiers, which are associated with the initial database table 660. There is a correlation between the position of the values at the bit vector, the subsequent number of the iteration, and the position of values in the database 660. For example, formula (1) may be used to determine iteratively the row identifiers for rows corresponding to positive bit values in bit vectors. In the exemplary formula (1), the number of stored values in a bit vector is 256, when the SIMD register 635 size is 256 bits.

$$\text{row\_id} = i*256 + j, \qquad (1)$$

where "i" is the subsequent number of the iteration, where "i" starts from 0 to n, and "j" is the position of the positive bit value in the bit vector.

In iterative manner, result data sets may be provided iteratively through subsequent querying the table 660. Therefore, evaluation of data for column "b'" 650 may not be pushed back and forth from the CPU 630 to the main memory 610 to determine the whole result set at a final iteration. Through utilizing the SIMD register 635, the performance of the evaluation of values from the database table based on the program instructions is enhanced.

Figure 7A:
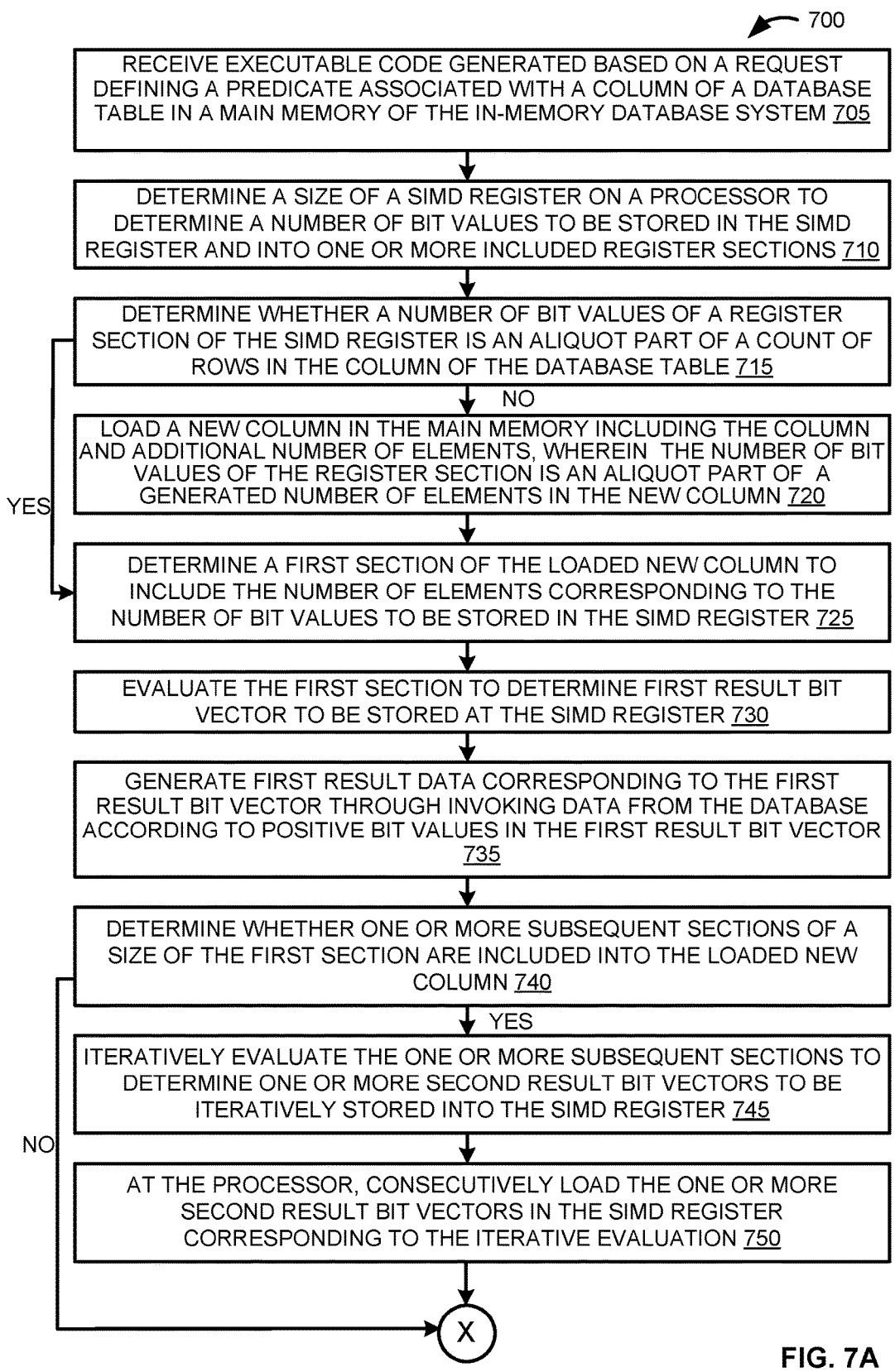
FIG. 7A and FIG. 7B are flow diagrams illustrating a process for executing program instructions related to operations over a data set through generating bit vectors at a computer processor for determining result data, according to one embodiment.
Figure 7B:
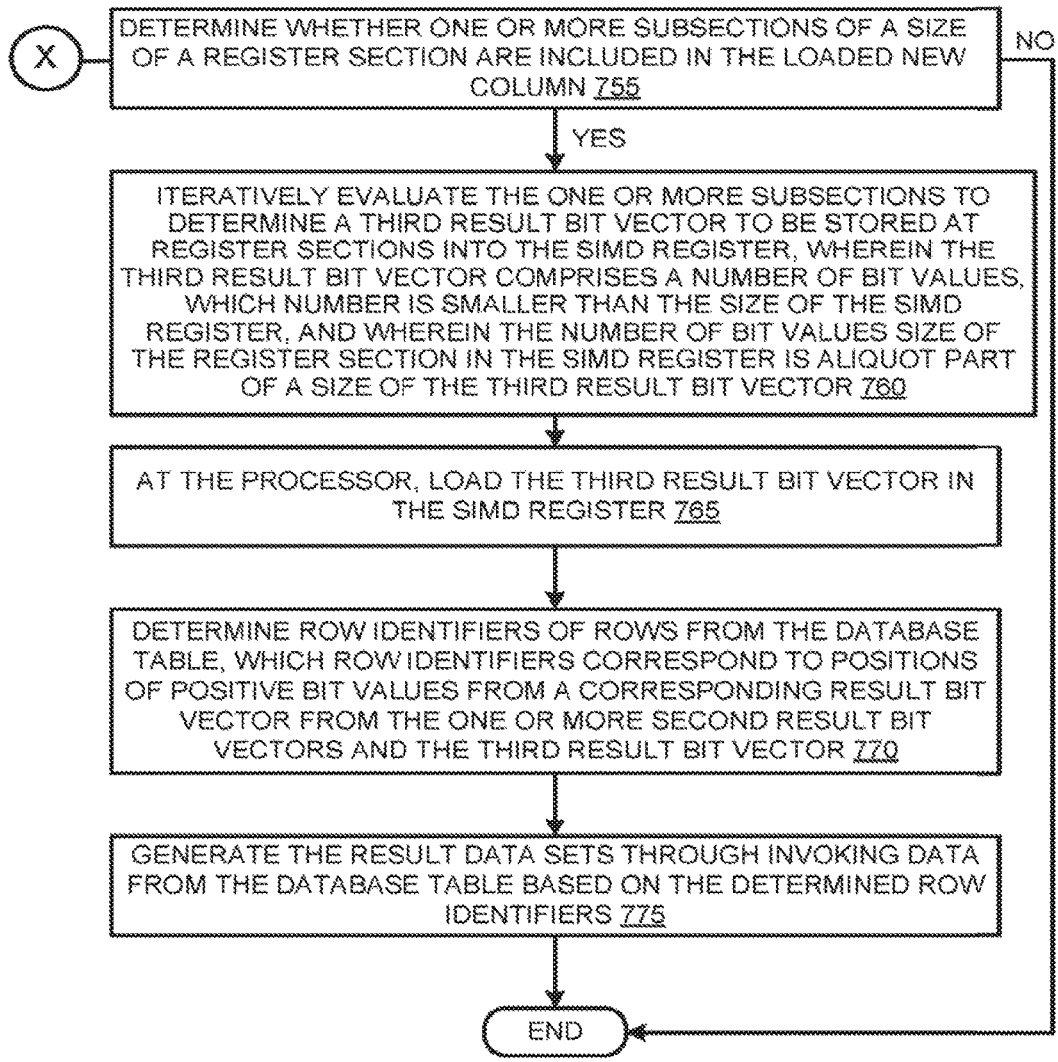

FIG. 7A and FIG. 7B are flow diagrams illustrating a process 700 for executing program instructions related to operations over a data set through generating bit vectors at a computer processor for determining result data, according to one embodiment. Process 700 is divided into steps presented in FIG. 7A and FIG. 7B.

At 705 (FIG. 7A), executable code generated based on a request is received. The request defines a predicate associated with a column of a database table in a main memory of an in-memory database system. At 710 (FIG. 7A), a size of a SIMD register on a processor from the in-memory database system is determined. The size of the SIMD register is determined to determine a number of bit values to be stored in the SIMD registers and into one or more included register sections. For example, the SIMD register may be of a size of 256 bits divided into 32 sections of 8 bits. In such an SIMD register, 256 bit values may be stored in 32 sections of 8 bit values. At 715 (FIG. 7A), it is determined whether a number of bit values of a register section of the SIMD register is an aliquot part of a count of rows in the column of the database table, which is associated with the predicate. When the number of bit values of the register section is not an aliquot part of the count of rows, at 720 (FIG. 7A), a new column is loaded in the main memory, which includes the column from the database and additional number elements. The new loaded column may be such as the new column "b'" 650, FIG. 6. When the number of bit values of the register section is an aliquot part of the count of rows, at 725 (FIG. 7A), a first section of the loaded new column is determined. The loaded new column includes the number of elements corresponding to the number of bit values to be stored in the SIMD register. At 730 (FIG. 7A), the first section of the loaded new column is evaluated to determine a first bit vector to be stored at the SIMD register. At 735 (FIG. 7A), first result data is generated corresponding to the first result bit vector through invoking data from the database according to determined positive bit values in the first result bit vector.

At 740 (FIG. 7A), it is determined whether one or more subsequent sections of a size of the first section are included into the loaded new column. For example, if the SIMD register size is 256 bits, then in the loaded new column it is determined how many times sections of 256 are included. If the numbers are 520, then there are 2 sections of 256, and also 8 values. Then, at the check at 740 (FIG. 7A), it may be determined that a second section of the size of the first section may be determined.

When the one or more subsequent sections of the size of the first section are determined, at 745 (FIG. 7A), the one or more subsequent sections are iteratively evaluated to determine one or more second result bit vectors to be iteratively stored into the SIMD register. At 750 (FIG. 7A), at the processor, the one or more second result bit vectors are loaded iteratively into the SIMD register corresponding to the iterative evaluation. When the one or more subsequent sections of the size of the first section are not determined, as there are less number left in the new column compared to the size of the first section, then, at 755 (FIG. 7B), it is determined whether there are one or more subsections of a size of a register section. The determination of the one or more subsections is performed for those of the elements from the loaded new column, which are not previously evaluated. For example, if the new column includes 264 elements and the SIMD register is of size 256 bits, then there is just one section of 256 values in the new column and one subsection of 8 bits size.

When the one or more second result bit vectors are loaded at 750 (FIG. 7A), then at 755 (FIG. 7B) it is once again determined whether there are one or more subsections of a size of a register section. For example, if the number are 520 in the new column, and the SIMD register is of size 256 bits in sections of 8 bits, then the first section that is evaluation would be of the first 256 values, then a subsequent section of the size of the first section is determined to include the second 256 number, and then a subsection of size of 8 value is determined. If there are no further subsections to be determined for the new column, then the process 700 ends.

If the one or more subsections are determined at 755 (FIG. 7B), then at 760 (FIG. 7B), the one or more subsections are iteratively evaluated. The one or more subsections are evaluated in an iterative mode to determine a third result bit vector to be stored at register sections into the SIMD register. The third result bit vector includes a number of bit values, which are of a smaller size compared to the size of the SIMD register. The number of bit values in a register section in the SIMD register is an aliquot part of a size of the third bit vector.

At 765 (FIG. 7B), the third result bit vector is loaded in the SIMD register at the processor. At 770 (FIG. 7B), row identifiers of rows from the database table are determined. The row identifiers correspond to position of positive bit values from corresponding result bit vectors from the one or more second result bit vectors and the third result bit vector. A result bit vector may be related to an order number of iterative evaluation. The order number of iterative evaluation corresponds to the order number of inclusion of the result bit vectors into the SIMD register. Through such an order number, the row identifier may be uniquely determined. For example, the row identifier of result data from the database table may be determined based on a formula that utilizes the order number of a given result bit vector and a position of a positive values from the given result bit vector. For example, if at a second determined result bit vector, there is a positive bit value at a second position (j=1, when j starts from 0), then the row identifier corresponding to that positive bit values may be determined according to a formula multiplying the order number minus 1, which is 2−1 equal to 1, to the number of bit values—256, plus the order number of the position in the bit vector—first position. Then the row identifier may be computed to −(2−1)*256+1=256+ 1=257 row identifier. There is data at $258^{th}$ row in the database table, which may be used for determining the result data. For example, formula (1) may also be used to determine the row identifier, where the iterations are counted starting from 1 to n. At 775 (FIG. 7B), the result data sets are generated through invoking data from the database table based on the determined row identifiers. The generation of the result data sets may be performed in iterations and not simultaneously.

If the evaluated data from a determined section of the new column includes the additional elements included at 720 (FIG. 7A), then the bit values determined for such additional elements are transformed into negative bit values in the result bit vector. Therefore, when result data is determined, the additional elements added are not reflecting the proper determination of data from the database table that corresponds to the defined predicate.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
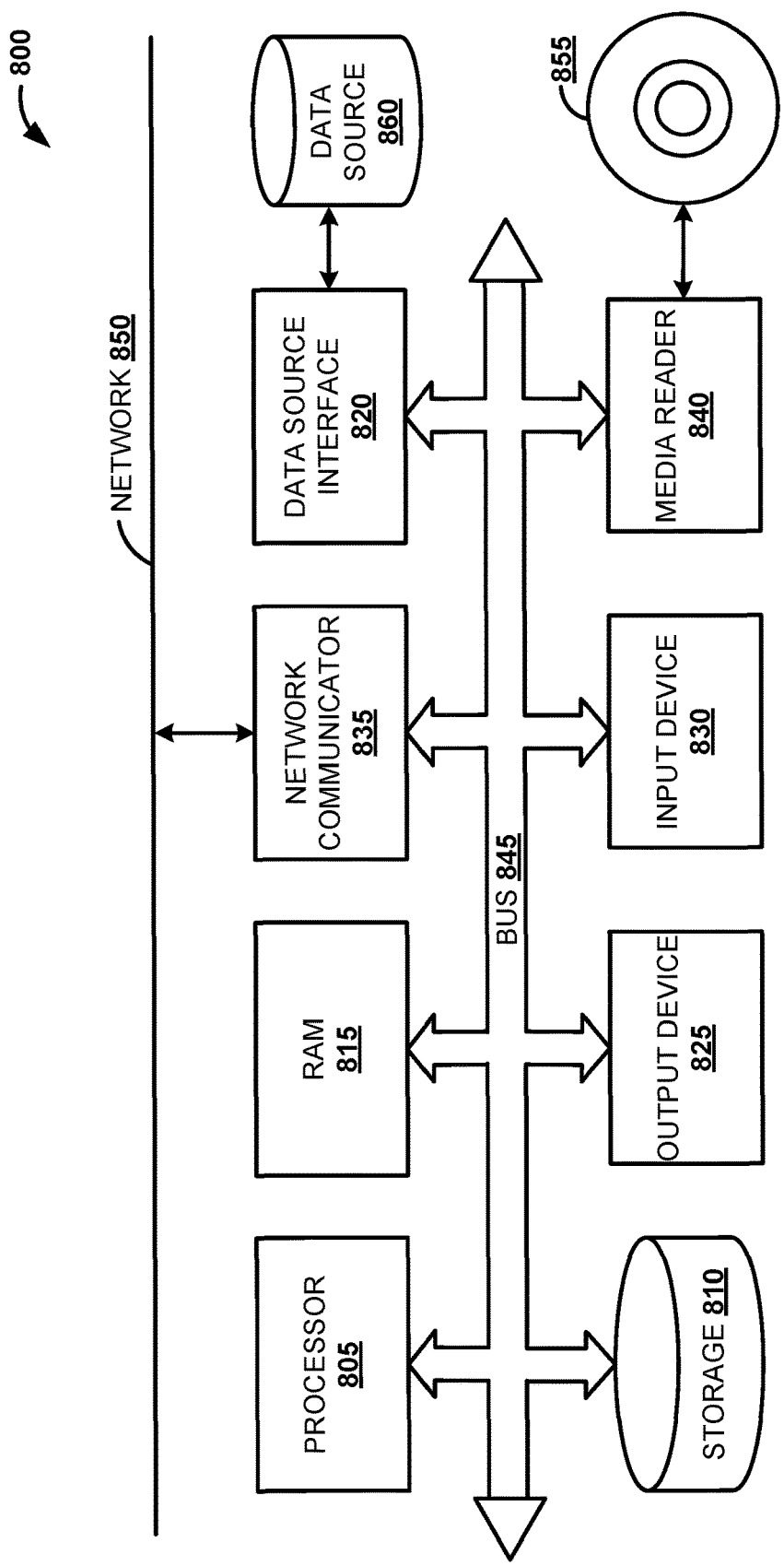
FIG. 8 is a block diagram illustrating an embodiment of a computing environment in which the techniques described for evaluating data associated with a program in an in-memory database system can be implemented.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, all of the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to evaluate data in an in-memory database system, the method comprising:
receiving executable code generated based on program instructions including a predicate associated with a column of a database table in a main memory of the in-memory database system, wherein the executable code defines processing data through a register at a processor associated with a single instruction multiple data operation;
when a number of bit values of a register section of the register at the processor is not an aliquot part of a count of rows in the column of the database table, loading a new column in the main memory of the in-memory database system including the column of the database table and additional number of data elements, wherein the number of bit values of the register section is an aliquot part of a number of elements in the new column;

based on evaluating a first section of the new column including a number of elements corresponding to a number of bit values to be stored at the register, loading a first result bit vector in the register, wherein the first result bit vector includes bit values defining whether elements of the first section comply with the predicate; and at the processor, determining and providing a first result data corresponding to the first section, wherein the first result data is determined based on the first result bit vector and based on invoking data from the database table in the main memory.

2. The method of claim 1, further comprising:
generating an executable plan for code generation for processing a database table through registers associated with the single instruction multiple data operation in the in-memory database system, wherein the executable plan is generated based on evaluation of the program instructions, and wherein the program instructions are defined for generating result data based on the database table.

3. The method of claim 1, further comprising:
determining a size of the register on the processor to determine the number of bit values to be stored in the register and into one or more included register sections, wherein the bit values to be stored in the register are determined to define evaluation results for processing data from the first section of the new column, and wherein the one or more register sections are of equal size.

4. The method of claim 1, wherein loading the new column in the main memory of the in-memory database system further comprises:
determining whether the number of bit values of the register section of the register at the processor is an aliquot part of the count of rows in the column of the database table;
determining the first section of the loaded new column to include the number of elements corresponding to the number of bit values to be stored in the register; and
evaluating the first section to determine the bit values of the first result bit vector to be stored in the register at the processor.

5. The method of claim 4, wherein determining the first section of the loaded new column to include the number of elements corresponding to the number of bit values to be stored in the register further comprises:
dividing the total number of elements from the loaded new column into one or more subsections of equal size, wherein a size of a subsection corresponds to a size of a register section.

6. The method of claim 4, further comprising:
determining whether one or more subsequent sections of a size of the first section are included into the loaded new column;
when the one or more subsequent sections are determined:
iteratively evaluating the one or more subsequent sections to determine one or more second result bit vectors to be iteratively stored into the register; and
at the processor, consecutively loading the one or more second result bit vectors in the register corresponding to the iterative evaluation;
determining whether one or more subsections of a size of a register section are included in the loaded new column;
when the one or more subsections are determined:
iteratively evaluating the one or more subsections to determine a third result bit vector to be stored at register sections into the register, wherein the third result bit vector comprises a number of bit values, which number is smaller than the size of the register, and wherein the number of bit values size of the register section in the register is aliquot part of a size of the third result bit vector; and
at the processor, loading the third result bit vector in the register; and
consecutively determining and providing result data sets based on the determined one or more second result bit vectors, the third result bit vector, and the database table.

7. The method of claim 6, wherein consecutively determining and providing the result data sets corresponding to the determined sections and subsections for the loaded new column further comprises:
defining the result data sets to include negative bit values corresponding to the additional number of data elements included in the new column;
determining row identifiers of rows from the database table, which row identifiers correspond to positions of positive bit values from a corresponding result bit vector from the one or more second result bit vectors and the third result bit vector, wherein the result bit vector is related to an order number of inclusion of the one or more second result bit vectors and the third result bit vector into the register to uniquely determine the row identifiers; and
generating the result data sets through invoking data from the database table based on the determined row identifiers.

8. A computer system to evaluate data in an in-memory database system, comprising:
a processor;
a memory in association with the processor storing instructions related to:
receive executable code generated based on program instructions including a predicate associated with a column of a database table in a main memory of the in-memory database system, wherein the executable code defines processing data through a register at the processor associated with a single instruction multiple data operation;
when a number of bit values of a register section of the register at the processor is not an aliquot part of a count of rows in the column of the database table, load a new column in the main memory of the in-memory database system including the column of the database table and additional number of data elements, wherein the number of bit values of the register section is an aliquot part of a number of elements in the new column;
based on evaluating a first section of the new column including a number of elements corresponding to a number of bit values to be stored at the register, load a first result bit vector in the register, wherein the first result bit vector includes bit values defining whether elements of the first section comply with the predicate; and
at the processor, determine and provide a first result data corresponding to the first section, wherein the first result data is determined based on the first result bit vector and based on invoking data from the database table in the main memory.

9. The system of claim 8, wherein the memory further comprises instructions to:
generate an executable plan for code generation for processing a database table through registers associated with the single instruction multiple data operation in the in-memory database system, wherein the executable plan is generated based on evaluation of the program instructions, and wherein the program instructions are defined for generating result data based on the database table.

10. The system of claim 8, wherein the memory further comprises instructions to:
determine a size of the register on the processor to determine the number of bit values to be stored in the register and into one or more included register sections,
wherein the bit values to be stored in the register are determined to define evaluation results for processing data from the first section of the new column,
and wherein the one or more register sections are of equal size.

11. The system of claim 8, wherein the instructions to load the new column in the main memory of the in-memory database system further comprise instructions to:
determine whether the number of bit values of the register section of the register at the processor is an aliquot part of the count of rows in the column of the database table;
determine the first section of the loaded new column to include the number of elements corresponding to the number of bit values to be stored in the register; and
evaluate the first section to determine the bit values of the first result bit vector to be stored in the register at the processor.

12. The system of claim 11, wherein the instructions to determine the first section of the loaded new column to include the number of elements corresponding to the number of bit values to be stored in the register further comprise instructions to:
divide the total number of elements from the loaded new column into one or more subsections of equal size, wherein a size of a subsection corresponds to a size of a register section.

13. The system of claim 11, wherein the memory further comprises instructions to:
determine whether one or more subsequent sections of a size of the first section are included into the loaded new column;
when the one or more subsequent sections are determined:
iteratively evaluate the one or more subsequent sections to determine one or more second result bit vectors to be iteratively stored into the register; and
at the processor, consecutively load the one or more second result bit vectors in the register corresponding to the iterative evaluation;
determine whether one or more subsections of a size of a register section are included in the loaded new column;
when the one or more subsections are determined:
iteratively evaluate the one or more subsections to determine a third result bit vector to be stored at register sections into the register, wherein the third result bit vector comprises a number of bit values, which number is smaller than the size of the register, and wherein the number of bit values size of the register section in the register is aliquot part of a size of the third result bit vector; and
at the processor, load the third result bit vector in the register; and
consecutively determine and provide result data sets based on the determined one or more second result bit vectors, the third result bit vector, and the database table.

14. The system of claim 13, wherein the instructions to consecutively determine and provide result data sets corresponding to determined sections and subsections for the loaded new column further comprise instructions to:
define the result data sets to include negative bit values corresponding to the additional number of data elements included in the new column;
determine row identifiers of rows from the database table, which row identifiers correspond to positions of positive bit values from a corresponding result bit vector from the one or more second result bit vectors and the third result bit vector, wherein the result bit vector is related to an order number of inclusion of the one or more second result bit vectors and the third result bit vector into the register to uniquely determine the row identifiers; and
generate the result data sets through invoking data from the database table based on the determined row identifiers.

15. A non-transitory computer-readable medium storing instructions, which when executed cause a computer system to:
receive executable code generated based on program instructions including a predicate associated with a column of a database table in a main memory of the in-memory database system, wherein the executable code defines processing data through a register at a processor associated with a single instruction multiple data operation;
when a number of bit values of a register section of the register at the processor is not an aliquot part of a count of rows in the column of the database table, load a new column in the main memory of the in-memory database system including the column of the database table and additional number of data elements, wherein the number of bit values of the register section is an aliquot part of a number of elements in the new column;
based on evaluating a first section of the new column including a number of elements corresponding to a number of bit values to be stored at the register, load a first result bit vector in the register, wherein the first result bit vector includes bit values defining whether elements of the first section comply with the predicate; and
at the processor, determine and provide a first result data corresponding to the first section, wherein the first result data is determined based on the first result bit vector and based on invoking data from the database table in the main memory.

16. The non-transitory computer-readable medium of claim 15, further storing instructions to:
generate an executable plan for code generation for processing a database table through registers associated with the single instruction multiple data operation in the in-memory database system, wherein the executable plan is generated based on evaluation of the program instructions, and wherein the program instructions are defined for generating result data based on the database table.

17. The non-transitory computer-readable medium of claim 15, further storing instructions to:

determine a size of the register on the processor to determine the number of bit values to be stored in the register and into one or more included register sections, wherein the bit values to be stored in the register are determined to define evaluation results for processing data from the first section of the new column, and wherein the one or more register sections are of equal size.

18. The non-transitory computer-readable medium of claim 15, wherein the instructions to load the new column in the main memory of the in-memory database system further comprises instructions to:

determine whether the number of bit values of the register section of the register at the processor is an aliquot part of the count of rows in the column of the database table;

determine the first section of the loaded new column to include the number of elements corresponding to the number of bit values to be stored in the register; and evaluate the first section to determine the bit values of the first result bit vector to be stored in the register at the processor.

19. The non-transitory computer-readable medium of claim 18, wherein the instructions to determine the first section of the loaded new column to include the number of elements corresponding to the number of bit values to be stored in the register further comprise instructions to:

divide the total number of elements from the loaded new column into one or more subsections of equal size, wherein a size of a subsection corresponds to a size of a register section.

20. The non-transitory computer-readable medium of claim 18, further storing instructions to:

determine whether one or more subsequent sections of a size of the first section are included into the loaded new column;

when the one or more subsequent sections are determined:

iteratively evaluate the one or more subsequent sections to determine one or more second result bit vectors to be iteratively stored into the register; and at the processor, consecutively load the one or more second result bit vectors in the register corresponding to the iterative evaluation;

determine whether one or more subsections of a size of a register section are included in the loaded new column;

when the one or more subsections are determined:

iteratively evaluate the one or more subsections to determine a third result bit vector to be stored at register sections into the register, wherein the third result bit vector comprises a number of bit values, which number is smaller than the size of the register, and wherein the number of bit values size of the register section in the register is aliquot part of a size of the third result bit vector; and at the processor, load the third result bit vector in the register; and consecutively determine and provide result data sets based on the determined one or more second result bit vectors, the third result bit vector, and the database table, wherein the instructions to determine the result data sets comprise instructions to:

define the result data sets to include negative bit values corresponding to the additional number of data elements included in the new column;

determine row identifiers of rows from the database table, which row identifiers correspond to positions of positive bit values from a corresponding result bit vector from the one or more second result bit vectors and the third result bit vector, wherein the result bit vector is related to an order number of inclusion of the one or more second result bit vectors and the third result bit vector into the register to uniquely determine the row identifiers; and generate the result data sets through invoking data from the database table based on the determined row identifiers.

\* \* \* \* \*